US012612176B2

(12) United States Patent
Sandiford et al.

(10) Patent No.: US 12,612,176 B2
(45) Date of Patent: Apr. 28, 2026

(54) AIRCRAFT FUEL TANK VENTING AND INERTING

(71) Applicant: Airbus Operations Limited, Bristol (GB)

(72) Inventors: James Patrick Sandiford, Bristol (GB); Joseph Lingard, Bristol (GB)

(73) Assignee: Airbus Operations Limited, Filton Bristol (GB)

( * ) Notice: Subject to any disclaimer, the term of this patent is extended or adjusted under 35 U.S.C. 154(b) by 63 days.

(21) Appl. No.: 18/646,130

(22) Filed: Apr. 25, 2024

(65) Prior Publication Data

US 2024/0359815 A1 Oct. 31, 2024

(30) Foreign Application Priority Data

Apr. 27, 2023 (GB) ..................................... 2306274

(51) Int. Cl.
| | |
|---|---|
| *B64D 37/32* | (2006.01) |
| *B60K 15/035* | (2006.01) |
| *B64D 37/02* | (2006.01) |
| *B64D 37/34* | (2006.01) |

(52) U.S. Cl.
CPC ............ *B64D 37/32* (2013.01); *B60K 15/035* (2013.01); *B64D 37/02* (2013.01); *B64D 37/34* (2013.01); *B60K 2015/03523* (2013.01); *B60K 2015/03528* (2013.01); *B60Y 2200/51* (2013.01)

(58) Field of Classification Search
CPC ........ B64D 37/32; B64D 37/14; B64D 37/02; B64D 37/34; B60Y 2200/51; B60K 15/035; B60K 2015/03528; B60K 2015/03523
See application file for complete search history.

(56) References Cited

U.S. PATENT DOCUMENTS

| | | | |
|---|---|---|---|
| 7,621,483 B2 | 11/2009 | Cozens et al. | |
| 9,102,416 B1 * | 8/2015 | Cutler ................ | A62C 99/0018 |
| 2005/0241700 A1 * | 11/2005 | Cozens .................. | B64D 37/32 |
| | | | 137/587 |
| 2015/0291291 A1 | 10/2015 | Regan | |
| 2018/0229853 A1 | 8/2018 | Sarkar et al. | |

OTHER PUBLICATIONS

United Kingdom Search Report for corresponding United Kingdom Patent Application No. 2306274.8 dated Sep. 25, 2023.

* cited by examiner

*Primary Examiner* — Atif H Chaudry
(74) *Attorney, Agent, or Firm* — Greer Burns & Crain Ltd.

(57) ABSTRACT

An aircraft fuel tank venting and inerting arrangement comprising a fuel tank, a venting fluid flow path between the fuel tank and a venting outlet, an inerting fluid flow path for delivering inerting fluid to the fuel tank, at least part of the venting fluid flow path being provided by a fluid flow conduit and at least part of the inerting fluid flow path being provided by the fluid flow conduit. An aircraft comprising such an arrangement and a method of venting and inerting an aircraft fuel tank.

18 Claims, 6 Drawing Sheets

IF

80

80A

80B

80C

81

AIRCRAFT FUEL TANK VENTING AND INERTING

CROSS-REFERENCES TO RELATED APPLICATIONS

This application claims the benefit of Great Britain Patent Application Number 2306274.8 filed on Apr. 27, 2023, the entire disclosure of which is incorporated herein by way of reference.

FIELD OF THE INVENTION

The present disclosure relates to the venting and inerting of aircraft fuel tanks.

The present invention concerns the venting and inerting of aircraft fuel tanks. More particularly, but not exclusively, this invention concerns an aircraft fuel tank venting and inerting arrangement. The invention also concerns an aircraft comprising an aircraft fuel tank venting and inerting arrangement, a fluid flow conduit suitable for use in an aircraft fuel tank venting and inerting arrangement, and a method of venting and inerting an aircraft fuel tank.

BACKGROUND OF THE INVENTION

It is well-known for aircraft to comprise an inerting arrangement for delivering inerting fluid (typically nitrogen-enriched air) into a fuel tank to reduce the risk of fire and/or explosions in the fuel tank. It is also well-known for aircraft to comprise a venting arrangement that allows gas to be vented into and out of a fuel tank, and/or to allow excess fuel to leave the fuel tank. Conventionally, a first set of conduits is provided to facilitate the delivery of inerting fluid to a fuel tank and a second set of conduits is provided to facilitate the venting of gas from the fuel tank. Such an arrangement, while versatile in so far as it permits separate installation, repair and removal of the two sets of conduits, requires the installation, repair and removal of two separate sets of conduits, which can be time-consuming, and may take up a relatively large amount of space in an aircraft wing, for example.

The present invention seeks to mitigate the above-mentioned problems. Alternatively or additionally, the present invention seeks to provide an improved aircraft fuel tank venting and inerting arrangement.

SUMMARY OF THE INVENTION

The present invention provides, according to a first aspect, an aircraft fuel tank venting and inerting arrangement, comprising:
- a fuel tank;
- a venting fluid flow path between the fuel tank and a venting outlet;
- an inerting fluid flow path for delivering inerting fluid to the fuel tank;
- at least part of the venting fluid flow path being provided by a fluid flow conduit; and
- at least part of the inerting fluid flow path being provided by the fluid flow conduit The present inventors have discovered that it is advantageous to use a common conduit to facilitate venting and inerting of a fuel tank. In a known, prior art arrangement, two pipes would be used, one for venting and one for inerting. The installation, removal and repair of an arrangement comprising a common conduit for venting and inerting are far simpler and less time consuming than in conventional arrangements where separate pipes are provided for venting and inerting.

For the avoidance of doubt, the terms "common conduit" and "common fluid flow conduit" are used interchangeably with "fluid flow conduit" to identify a conduit that provides at least a portion of a venting fluid flow path and at least a portion of an inerting fluid flow path. In particular, the word "common" is used to identify, and distinguish, a conduit that provides both (i) at least a portion of a venting fluid flow path and (ii) at least a portion of an inerting fluid flow path.

For the avoidance of doubt, the terms "aircraft fuel tank venting and inerting arrangement" and "arrangement" are used interchangeably in the present specification.

A venting outlet typically permits egress of fluid, such as a venting fluid or fuel. For the avoidance of doubt, "venting outlet" typically also permits ingress of fluid (for example, ambient air) into a fuel tank.

The arrangement may comprise a plurality of aircraft fuel tanks. The arrangement may comprise one or more aircraft wings. At least one aircraft wing may comprise one or more fuel tanks (often referred to as a "wing tank"). The arrangement may comprise a central aircraft portion located between two aircraft wings. The central aircraft portion may comprise one or more fuel tanks (often referred to as a "center tank").

The arrangement may comprise a plurality of inerting fluid flow paths for delivering inerting fluid to fuel tank(s) and/or a plurality of venting fluid flow paths between fuel tank(s) and respective venting outlets.

Those skilled in the art will realize that the aircraft fuel tank venting and inerting arrangement of the present invention may comprise at least one conduit configured to carry inerting fluid only and at least one conduit configured to carry venting fluid only, in addition to a fluid flow conduit that provides at least part of a venting fluid flow path and at least part of an inerting fluid flow path. This is because a venting fluid flow path from a fuel tank to a venting outlet will be different from an inerting fluid flow path from a source of inerting fluid to a fuel tank. There will, therefore, be parts of an inerting fluid flow path that are not common with a venting fluid flow path. For example, the venting fluid flow path optionally comprises a terminal portion adjacent a venting outlet. In some embodiments, the inerting fluid flow path will not need to share a conduit with the terminal portion of the venting fluid flow path. Therefore, the terminal portion of the venting fluid flow path may be provided by a conduit that is configured to carry only venting fluid, and not inerting fluid. Similarly, the inerting fluid flow path may comprise a receiving portion configured to receive inerting fluid from a source of inerting fluid (such as a source of nitrogen-enriched air). In some embodiments, the venting fluid flow path will not need to share a conduit with the receiving portion of the inerting fluid flow path. Therefore, the receiving portion of the inerting fluid flow path may be provided by a conduit that is configured to carry only inerting fluid, and not venting fluid.

The fluid flow conduit may comprises a first, venting region for the passage therethrough of venting fluid and a second, inerting region for the passage therethrough of inerting fluid. One or both of the first, venting region and the second, inerting region may optionally be elongate.

Each of the first, venting region and the second, inerting region may extend between a first position along the fluid flow conduit and a second position along the fluid flow conduit. The first, venting region may have substantially the same length as the second, inerting region.

The fluid flow conduit may optionally comprise a longitudinal axis. The first, venting region and the second, inerting region may optionally be mutually spaced across the longitudinal axis.

One of the first, venting region and the second, inerting region may be located within a space defined by the other of the first, venting region and the second, inerting region. For example, one of the first, venting region and the second, inerting region may be circular cylindrical in shape (circular in cross-section, for example), and may be surrounded by the other of first, venting region and the second, inerting region, which other of the first, venting region and the second, inerting region is optionally an annular cylinder in shape (annular in cross-section, for example). One of the first, venting region and the second, inerting region may be concentrically arranged with the other of the first, venting region and the second, inerting region.

The first, venting region and the second, inerting region are optionally isolated from one another so that inerting fluid in the second, inerting region is prohibited from entering the venting region and venting fluid in the first, venting region is prohibited from entering the inerting region. The first, venting region and the second, inerting region may optionally be separated by a fluid-impermeable wall. The wall may be planar or may be cylindrical, for example.

The first, venting region may be located inside the second, inerting region. Such an arrangement may help inhibit unwanted cooling of venting fluid, which may cause unwanted icing of components in the venting fluid flow path. Inerting fluid may optionally be above ambient temperature. In this connection, engine bleed air may be used as a source of inerting fluid, with oxygen being removed from the engine bleed air to form the inerting fluid. Such engine bleed air is typically at an elevated temperature and sometimes has to be cooled prior to use. The first, venting region may be circular in cross-section, for example. The second, inerting region may be annular in cross-section, for example. The first, venting region may be concentrically arranged within the second, inerting region.

The arrangement may be provided with a sensor for detecting leaks in the inerting fluid flow path. The arrangement may be provided with a sensor for detecting leaks in the venting fluid flow path.

At least part of the fluid flow conduit may be located in a fuel tank. The fuel tank may be a center tank or a wing tank. The arrangement may comprise at least one portion of a common fluid flow conduit that provides at least part of the venting fluid flow path and at least part of the inerting fluid flow path. At least one portion of said common fluid flow conduit may be located in a wing tank or a center tank. At least one portion of said common fluid flow conduit may be located in a rear portion of the fuel tank, optionally if the fuel tank is a wing tank. At least one portion of said common fluid flow conduit may extend from an inboard position to an outboard position. The inboard position may be closer than the outboard position to a centerline of the aircraft. Optionally, the venting fluid flow path optionally comprises a terminal portion adjacent the outboard position of a portion of common fluid flow conduit. The terminal portion is optionally adjacent to a venting outlet. At least one portion of common fluid flow conduit may be located in an upper portion of a fuel tank. In this connection, upper is determined when the aircraft is in a normal attitude.

At least one portion of said fluid flow conduit may be located in a center tank. At least one portion of said fluid flow conduit may extend across the center tank, optionally normal to a longitudinal axis of an aircraft, and optionally normal to a line of flight of an aircraft.

The arrangement may comprise more than one fluid flow conduit that provides at least part of a venting fluid flow path and at least part of an inerting fluid flow path. For example, the arrangement may comprise at least one portion of a common fluid flow conduit located in a starboard wing tank, optionally at least one portion of a common fluid flow conduit located in a port wing tank and optionally at least one portion of a common fluid flow conduit located in a center tank.

If present, at least one portion of a common fluid flow conduit in a starboard wing tank may optionally extend from an inboard position to an outboard position. At least one portion of said common fluid flow conduit may be located in an upper portion of the starboard fuel tank. If present, at least one portion of said common fluid flow conduit located in a starboard wing tank may be located in a rear portion of the starboard wing tank.

If present, at least one portion of a common fluid flow conduit in a port wing tank may optionally extend from an inboard position to an outboard position. At least one portion of said common fluid flow conduit may be located in an upper portion of the port fuel tank. If present, at least one portion of the common fluid flow conduit located in a port wing tank may be located in a rear portion of the port wing tank.

The arrangement may comprise a receiving portion of the inerting fluid flow path. The receiving portion may be provided by a conduit that is configured to carry inerting fluid, but not venting fluid. The receiving portion may be configured to receive inerting fluid from a source of inerting fluid. The receiving portion may be located in a fuel tank, optionally a central fuel tank. The receiving portion may be in fluid communication with a portion of a common fluid flow conduit located in a fuel tank, optionally a central fuel tank.

At least one inerting fluid flow path may be provided with a weir for inhibiting movement of liquid therepast. For example, a weir may be configured to inhibit movement of liquid upstream of the weir, for example, against a flow direction of inerting fluid. The weir may comprise a change in height of a conduit for carrying inerting fluid.

At least one, optionally more than one and optionally each fuel tank comprises at least one fuel drain for permitting fuel present in the venting fluid flow path to enter a fuel tank.

The arrangement may comprise one or more inlets for introducing inerting fluid into one or more fuel tanks. For example, the arrangement may comprise a plurality of inlets for introducing inerting fluid into one or more fuel tanks. The arrangement may comprise multiple fuel tanks, each fuel tank being provided with one or more inlets for introducing inerting fluid into the respective fuel tank. The arrangement may comprise at least one spur providing fluid communication to an inlet for introducing inerting fluid into one or more fuel tanks, optionally from a portion of a common fluid flow conduit. At least one, optionally more than one and optionally each spur is configured to carry only inerting fluid, and not venting fluid. Optionally, the arrangement comprises a plurality of such spurs, optionally one for each inlet for introducing inerting fluid into a fuel tank.

Optionally, at least part of a venting fluid flow path may be provided by a vent conduit configured to carry venting fluid, but not inerting fluid. One or more vent conduits may be located in at least one fuel tank, optionally more than one fuel tank. One or more vent conduits may be located in more than one fuel tank, such as a center tank and a wing tank. A vent conduit may extend from an inboard position to an outboard position, the inboard position being closer than the outboard position to a centerline of an aircraft. A vent conduit may be in communication with, and optionally terminated by, a venting outlet. A vent conduit may be in communication with more than one venting outlet, one venting outlet being in a more outboard position than another venting outlet. A vent conduit may be located in a forward position.

Optionally, each fuel tank may be provided with at least one venting outlet. A venting outlet may vent to the outside of the aircraft (for example, the outside of an aircraft wing) or to a surge tank. For example, if a fuel tank is a central fuel tank, then optionally a venting outlet located in, or proximate to, the central fuel tank may vent to the outside of the aircraft, optionally in an outboard position, optionally adjacent to a wing tank (if present). If the arrangement comprises a wing tank, then a wing tank may optionally be provided with a venting outlet to a surge tank (the venting outlet optionally being located in an outboard position) and/or a venting outlet located in an inboard position, optionally adjacent a center tank (if present). Optionally, one or more venting outlet may be located in a forward position, and optionally one or more venting outlet may be located in a rearward position.

The aircraft fuel tank venting and inerting arrangement may comprise a source of inerting fluid. The source of inerting fluid may comprise a source of nitrogen-enriched air (sometimes known as oxygen-depleted air). The source of inerting fluid may comprise an oxygen remover for decreasing the amount of oxygen in a fluid. The source of inerting fluid may comprise a source of air configured to deliver air to said oxygen remover. The source of air may, for example, comprise an aircraft engine and/or a conduit configured to deliver a gas, such as air, from an aircraft engine. Such a conduit may comprise an engine bleed line. The aircraft fuel tank venting and inerting arrangement may be configured to deliver air from an aircraft engine to an oxygen remover for decreasing the amount of oxygen in said air.

According to a second aspect of the present invention, there is also provided an aircraft comprising an aircraft fuel tank venting and inerting arrangement in accordance with the first aspect of the present invention. The aircraft may comprise one or more engines, the aircraft fuel tank venting and inerting arrangement being configured to receive air from at least one engine. The air may be used as a source of inerting fluid. For example, the aircraft fuel tank venting and inerting arrangement may be configured to receive air from an engine bleed valve. The air may then be treated (for example, by passing the air through an appropriate filter) to reduce the amount of oxygen in the gas.

The aircraft may have at least two engines. The aircraft may have two (and only two) engines. The aircraft may have four engines, for example. The aircraft may be a fixed wing aircraft. The aircraft may optionally be a rotary wing aircraft.

The aircraft may be a single aisle aircraft. The aircraft may be a dual aisle aircraft. The aircraft may be a passenger aircraft, for example, a passenger aircraft capable of carrying at least 100 passengers. The aircraft may have a wingspan of at least 30 m, and optionally at least 35 m. The aircraft may have a length of at least 30 m and optionally at least 35 m. The aircraft may have a maximum take-off weight (MTOW) of at least 50 tons, optionally of at least 60 tons and optionally of at least 70 tons.

According to a third aspect of the present invention there is also provided a fluid flow conduit suitable for use in the aircraft fuel tank venting and inerting arrangement of the first aspect of the present invention. The fluid flow conduit may comprise one or more of the features described above in relation to the aircraft fuel tank venting and inerting arrangement of the first aspect of the present invention.

According to a fourth aspect of the present invention there is also provided a method of venting and inerting an aircraft fuel tank, the method comprising:

passing inerting fluid to an aircraft fuel tank through a fluid flow conduit while permitting passage of venting fluid to and from the aircraft fuel tank through the same fluid flow conduit.

The method may comprise passing inerting fluid through the fluid flow conduit in a first direction. The method may comprise permitting passage of venting fluid through the same fluid flow conduit in a second direction, optionally different from the first direction, optionally substantially opposite the first direction.

The method may comprise passing inerting fluid through an outer region of the fluid flow conduit. The method may comprise permitting passage of venting fluid through an inner region of the fluid flow conduit. The inner region may be within the outer region.

The method may comprise passing inerting fluid through an inerting region of the fluid flow conduit from a first position along the fluid flow conduit to a second position along the fluid flow conduit, while permitting passage of venting fluid through a venting region of the fluid flow conduit between said first position along the fluid flow conduit and said second position along the fluid flow conduit.

The method may comprise determining whether or not it is desirable to inert the fuel tank. This may comprise determining a phase of flight of the aircraft, such as ascent or descent. The method may comprise, dependent on said determination, passing inerting fluid to the fuel tank through the fluid flow conduit.

The fluid flow conduit used in the method of the fourth aspect of the present invention may comprise one or more of the features of the fluid flow conduit described above in relation to the arrangement of the first aspect of the present invention. A venting fluid flow path from the fuel tank to a venting outlet may be provided. An inerting fluid flow path for delivering inerting fluid to the fuel tank may be provided. At least part of the venting fluid flow path may be provided by said fluid flow conduit. At least part of the inerting fluid flow path may be provided by the fluid flow conduit.

The method of the fourth aspect of the present invention may comprise providing an aircraft fuel tank inerting and venting arrangement in accordance with the first aspect of the present invention. The method of the fourth aspect of the present invention may comprise providing a fluid flow conduit in accordance with the third aspect of the present invention. The method of the fourth aspect of the present invention may comprise providing an aircraft in accordance with the second aspect of the present invention.

It will, of course, be appreciated that features described in relation to one aspect of the present invention may be incorporated into other aspects of the present invention. For example, the method of the fourth aspect of the invention may incorporate any of the features described with reference to the aircraft fuel tank venting and inerting arrangement of the first aspect of the invention and vice versa.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figure 1A:
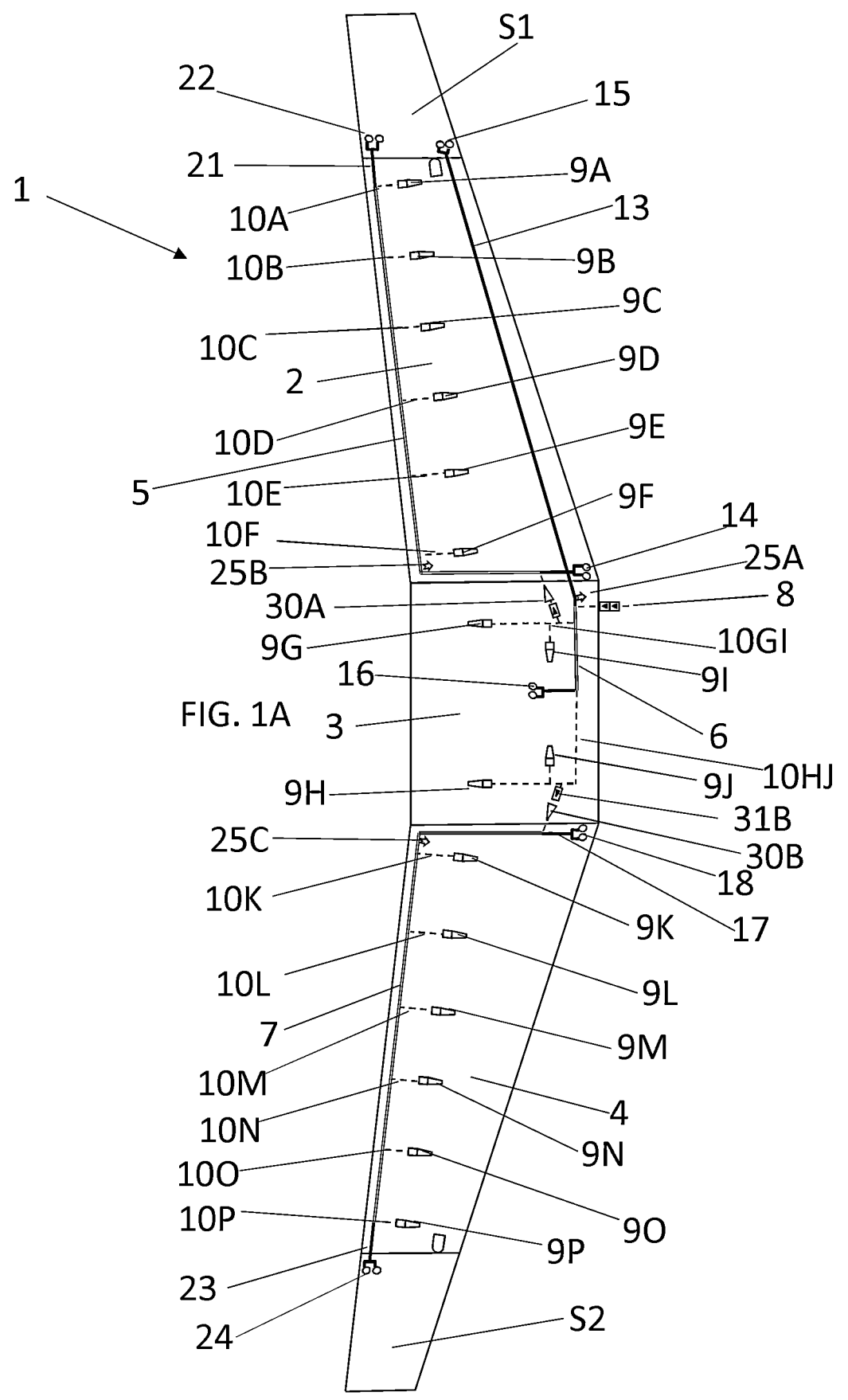
FIG. 1A shows a schematic plan view of an example of an aircraft fuel tank venting and inerting arrangement according to a first embodiment of the invention.

An example of an aircraft fuel tank venting and inerting arrangement in accordance with an embodiment of the present invention will now be described, primarily with reference to FIGS. 1A-D and 2. The aircraft fuel tank venting and inerting arrangement ("the arrangement") is denoted generally be reference numeral 1. The arrangement 1 comprises three fuel tanks; a center tank 3 located between a port wing tank 2 and a starboard wing tank 4. The arrangement 1 is configured to allow inerting fluid (in the form of nitrogen-enriched air) to be introduced into the respective fuel tank 2, 3, 4, above any fuel in the fuel tank 2, 3, 4. The provision of inerting fluid into a space above fuel in a fuel tank is known to those skilled in the art. The arrangement 1 is configured to allow venting of gas in and out of the fuel tanks 2, 3, 4. The provision of venting between a fuel tank and ambient atmosphere is known to those skilled in the art. The pressure of gas about the fuel in the fuel tank is typically ambient pressure or thereabouts. The arrangement 1 comprises many inerting fluid flow paths for delivering inerting fluid to three fuel tanks, and also many venting fluid flow paths between the three fuel tanks and a venting outlet. In conventional, known arrangements, the inerting fluid flow paths would be provided by a set of inerting pipes that would carry inerting fluid to the fuel tanks, and the venting fluid flow paths would be provided by a set of venting pipes that would permit venting between a venting outlet and the fuel tanks. In the arrangement 1 of the present embodiment, at least part of an inerting flow path and at least part of a venting flow path are provided by a common fluid flow conduit 5, 6, 7. As can be best seen in FIGS. 2 and 3, common fluid flow conduit 5, 6, 7 comprises a central, venting region 102 separated from an outer, inerting region 103 by an inner cylindrical wall 100. Common fluid flow conduit 5, 6, 7 comprises an outer cylindrical wall 101. The inner 100 and outer 101 cylindrical walls are concentrically arranged. Central, venting region 102 has a diameter of about 75% of the diameter of outer, inerting region 103. Both venting region 102 and inerting region 103 extend between (and in this case, beyond) positions P1 and P2 along the common fluid flow conduit 5, 6, 7.

Figure 2:
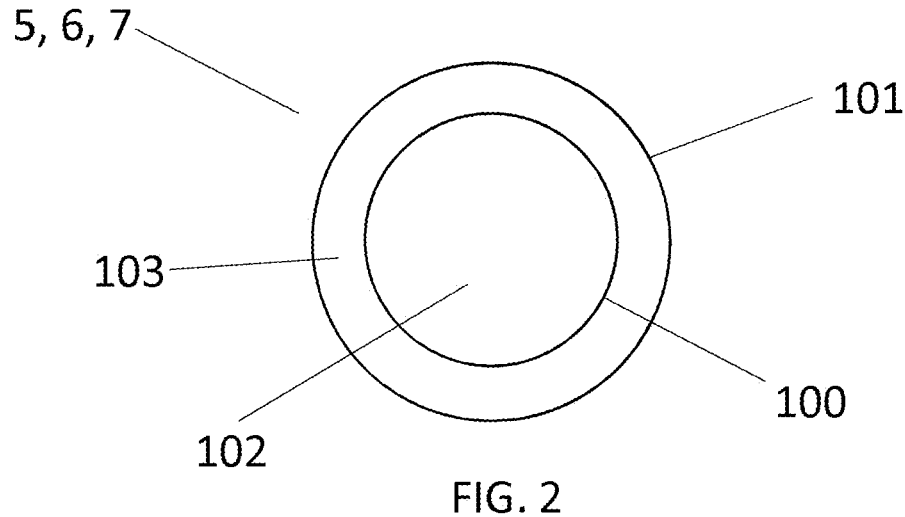
FIG. 2 shows a cross-section through a fluid flow conduit used in the aircraft fuel tank venting and inerting arrangement of FIG. 1A.
Figure 3:
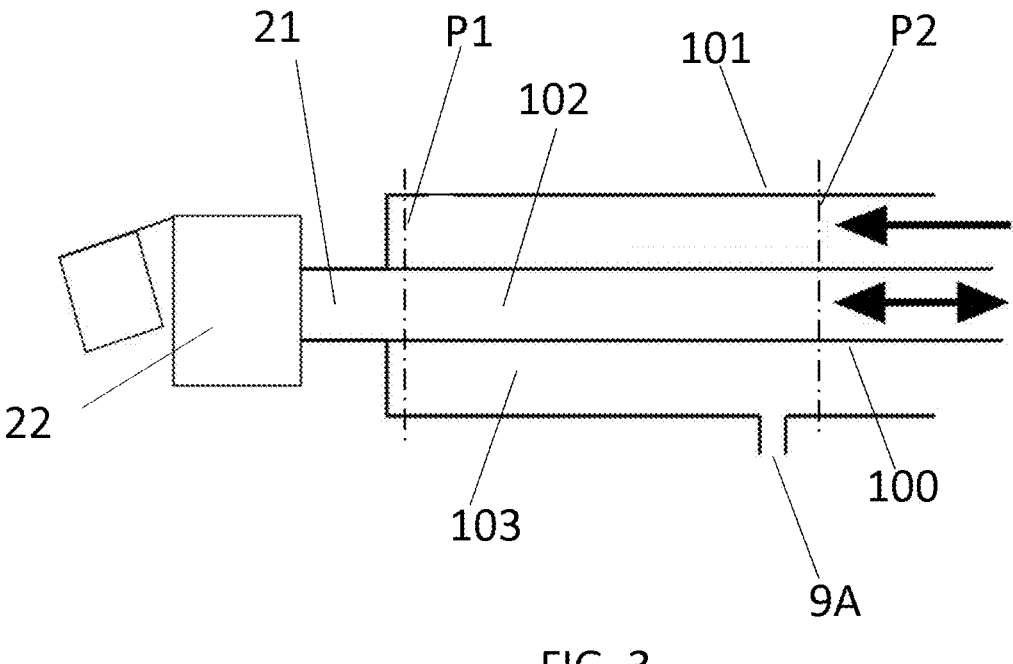
FIG. 3 shows a schematic cross-section through an example of a part of an aircraft fuel tank venting and inerting arrangement in accordance with another embodiment of the invention.

The advantages of using such a common fluid flow conduit 5, 6, 7 will now be described, with reference to FIGS. 2 and 3. The minimum lateral dimension of a separate venting pipe and a separate inerting pipe would be about 25% more than the lateral dimension of a common fluid flow conduit. The common fluid flow conduit 5, 6, 7 would therefore occupy less lateral space than two separate pipes. Furthermore, the installation, maintenance and removal of a common fluid flow conduit is simpler than for two separate venting and inerting pipes. Also, the venting region 102 of the common fluid flow conduit 5, 6, 7 is located within the inerting region 103. Inerting fluid is often at an elevated temperature because the inerting fluid is taken from an engine bleed. This may prevent the formation of ice in a venting fluid flow path, such formation of ice sometimes leading to undesirable blockages in a venting fluid flow path.

Figures 1B, 1C, 1D:
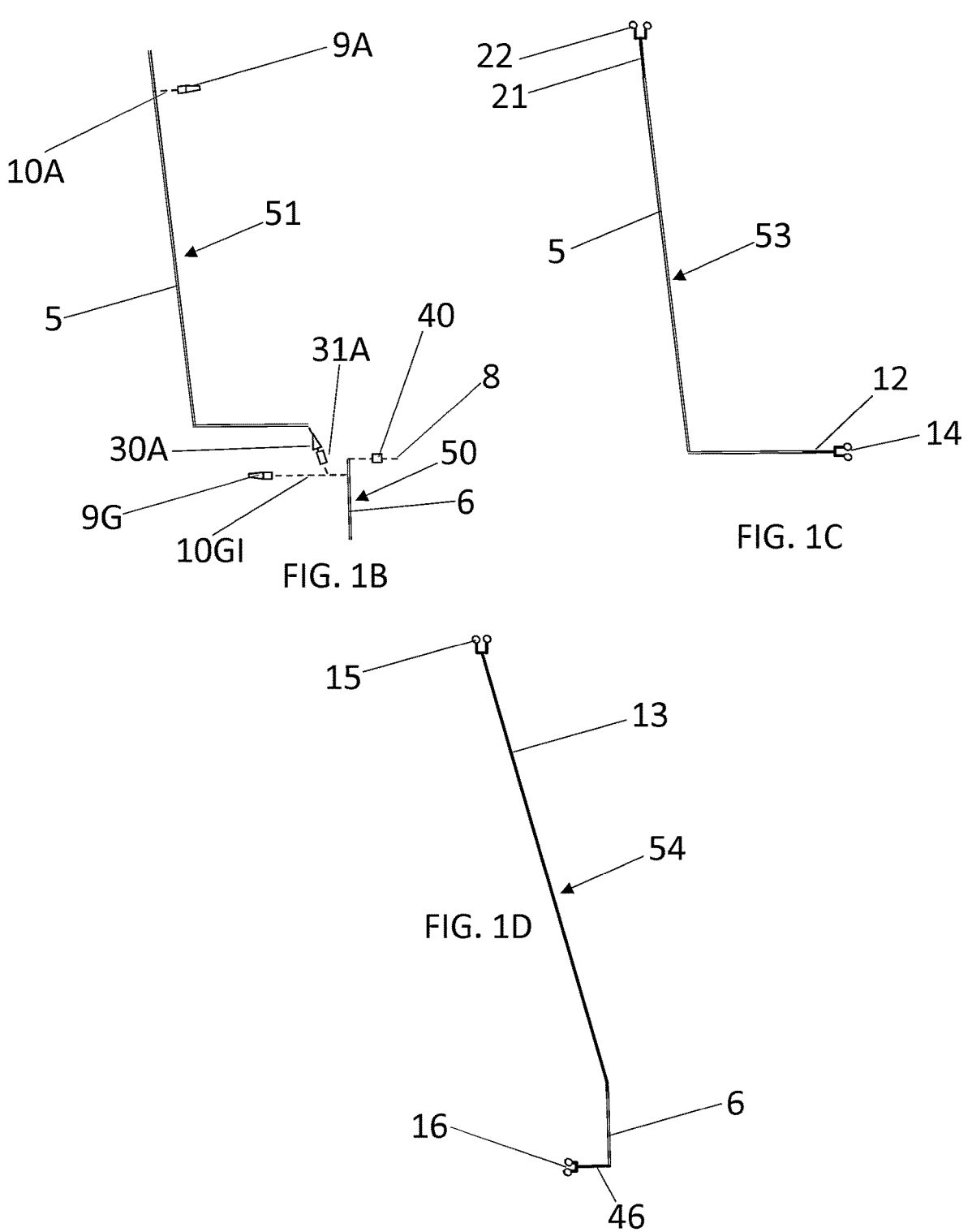
FIG. 1B shows two inerting flow paths in the aircraft fuel tank venting and inerting arrangement of FIG. 1A.
FIG. 1C shows a venting flow path in the aircraft fuel tank venting and inerting arrangement of FIG. 1A.
FIG. 1D shows another venting flow path in the aircraft fuel tank venting and inerting arrangement of FIG. 1A.

The incorporation of common fluid flow conduits 5, 6, 7 for carrying both the venting and inerting fluids into the aircraft fuel tank venting and inerting arrangement 1, and the operation of arrangement 1, will now be described. Inerting of fuel tanks 2, 3, 4 will be described first. Referring to FIGS. 1A, 1B and 2, inerting fluid (typically in the form of nitrogen-enriched air) is received into a receiving conduit 8, which is partially located in center tank 3. Receiving conduit 8 is provided with a dual flapper check valve 40 that inhibits passage of fluid (such as fuel) upstream. Receiving conduit 8 carries only inerting fluid and does not carry venting fluid. Receiving conduit 8 is in fluid communication with common fluid flow conduit 6, delivering inerting fluid into the outer, inerting region 103 of common fluid flow conduit 6. Common fluid flow conduit 6 is located within, and extends laterally across, center tank 3. Inerting fluid is delivered to center tank 3 from common fluid flow conduit 6 via nozzles 9G, 9H, 9I, 9J. Inerting fluid is also delivered to the outer, inerting region 103 of common fluid flow conduit 7 via inerting line 10HJ, and restrictor 30B and non-return valve 31B. Inerting fluid is delivered the outer, inerting region 103 of common fluid flow conduit 5 via restrictor 30A and non-return valve 31A.

The restrictor controls the mass flow of inerting fluid, while the non-return valve inhibits backflow of inerting fluid and inhibits passage therepast of any fuel that may have entered the conduit. Inerting fluid passes along common fluid flow conduit 7 and into starboard fuel tank 4 via nozzles 9K-P. A spur 10K-P, which carries inerting fluid only and not venting fluid, connects each nozzle 9K-9P to common fluid flow conduit 7. Inerting fluid passes along common fluid flow conduit 5 and into fuel tank 2 via nozzles 9A-F. A spur 10A-F, which carries inerting fluid only and not venting fluid, connects each nozzle 9A-F to common fluid flow conduit 5.

Various inerting fluid flow paths will now be described. Referring to FIGS. 1A and 1B, an inerting fluid flow path 50 is provided for delivering inerting fluid to center tank 3 via receiving conduit 8, non-return valve 40, common fluid flow conduit 6, spur 10GI and nozzle 9G. A further inerting fluid flow path 51 is provided for delivering inerting fluid to port wing tank 2 via receiving conduit 8, non-return valve 40, common fluid flow conduit 6, restrictor/non-return valve 30A, common fluid flow conduit 5 and nozzle 9A. Those skilled in the art will realize that many other inerting fluid flow paths are present.

Common fluid flow conduits 5, 7 are located within the respective fuel tank 2, 4. Each common fluid flow conduit 5, 7 is located in a rearwards position, proximate the rear of the respective fuel tank 2, 4, and extends from an inboard position to an outboard position. "Rear" is determined in relation to the expected, normal direction of forwards flight of an aircraft comprising the arrangement 1. Furthermore, each of the common fluid flow conduits 5, 7 is located in an elevated position, proximate the top of the respective fuel tank 2, 4. This facilitates the delivery of inerting fluid to the space above the fuel in a fuel tank. "Elevated" is determined in relation to the normal, upright orientation of the aircraft.

Referring to FIG. 1A, center tank 3 is provided with fuel drain valve 25A. Starboard wing tank 4 is provided with fuel drain valve 25C. Port wing tank 2 is provided with fuel drain valve 25B. Those fuel drain valves are located towards the low points on the respective pipe or conduit. They allow fuel in the venting pipework to enter the fuel tank. Fuel drain valve 25B is in fluid communication with an inner, venting region 102 of common fluid flow conduit 5. Fuel drain valve 25C is in fluid communication with an inner, venting region 102 of common fluid flow conduit 7. Fuel drain valve 25A is in fluid communication with vent pipe 13.

The venting fluid flow paths for the three fuel tanks 2, 3, 4 will now be described with reference to FIGS. 1A, 1C and 1D. Inner, venting region 102 of common fluid flow conduit 5 is in fluid communication with venting outlet 22 (in the form of a bifurcated bellmouth arrangement) via termination portion 21. Venting outlet 22 is in fluid communication with a surge tank S1, which is provided with a vent (not shown) that maintains the surge tank S1 at ambient pressure. Venting outlet 22 permits fluid communication between the ambient atmosphere and port wing tank 2. Termination portion 21 only carries venting fluid, and does not carry inerting fluid. Inner, venting region 102 of common fluid flow conduit 5 is also in fluid communication with vent 14 via connection conduit 12 (see FIG. 1B). Connection conduit 12 is configured to carry only venting fluid, not inerting fluid. Vent 14 is provided in fuel tank 2 and permits fluid communication between the fuel tank 2 and the ambient atmosphere via connection conduit 12, inner portion 102 of common fluid flow conduit 5, terminating portion 21 and venting outlet 22.

Inner, venting region 102 of common fluid flow conduit 7 is in fluid communication with venting outlet 24 (in the form of a bifurcated bellmouth arrangement) via termination portion 23. Venting outlet 24 is in fluid communication with a surge tank S2, which is provided with a vent (in the form of a NACA duct, not shown) that maintains the surge tank S2 at ambient pressure. Venting outlet 24 permits fluid communication between the ambient atmosphere and starboard wing tank 4. Termination portion 23 only carries venting fluid, and does not carry inerting fluid. Inner, venting region 102 of common fluid flow conduit 7 is also in fluid communication with vent 18 via connection conduit 17. Connection conduit 17 is configured to carry only venting fluid, not inerting fluid. Vent 18 is provided in fuel tank 4 and permits fluid communication between the fuel tank 4 and the ambient atmosphere via connection conduit 17, inner portion 102 of common fluid flow conduit 7, terminating portion 23 and venting outlet 24.

The venting fluid flow path 54 for center tank 3 will now be described. Referring to FIG. 1A and FIG. 1D, venting outlet 15 is in fluid communication with surge tank S1 and with venting conduit 13. Venting conduit 13 is in fluid communication with the inner or center portion 102 of common fluid flow conduit 6, which, in turn, is in fluid communication with venting conduit 46, which is in fluid communication with vent 16, which vent 16 is located in an upper portion of fuel tank 3. This arrangement facilitates maintaining fuel tank 3 at ambient pressure.

Figure 4:
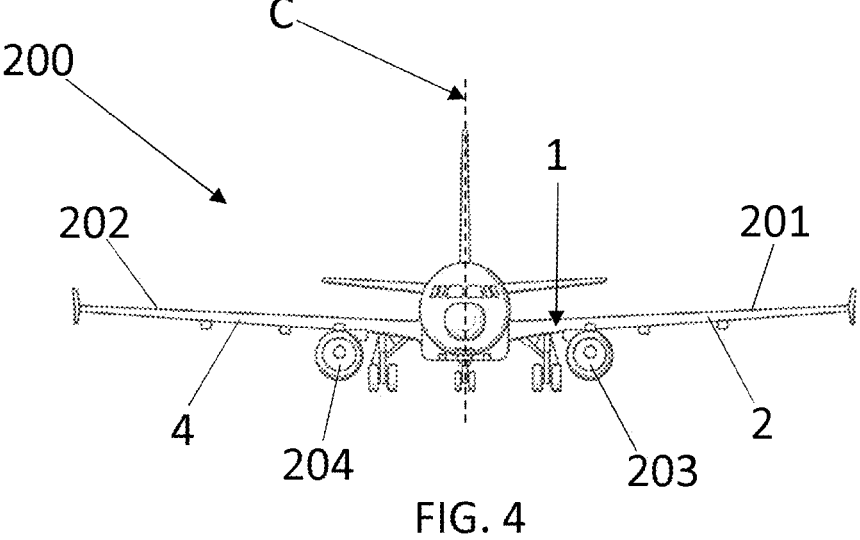
FIG. 4 shows an example of an aircraft according to another embodiment of the invention.

FIG. 4 shows an aircraft in accordance with an example of an embodiment of the present invention. The aircraft is denoted generally by reference numeral 200, and comprises the aircraft fuel tank venting and inerting arrangement 1 as described above. Aircraft centerline C is shown. Port wing tank 2 is located in aircraft port wing 201 and starboard wing tank 4 is located in starboard wing 202. Aircraft 200 comprises two engines 203, 204, both of which are used to provide air via a bleed valve (not shown) to a filter (not shown) that removes some of the oxygen from the air, thereby providing nitrogen-enriched air (otherwise known as oxygen-depleted air) that can be provided as inerting fluid to the fuel tanks. Those skilled in the art will realize that the provision of air via an engine bleed valve to a filter that provides nitrogen-enriched air is well-known to those skilled in the art. Those skilled in the art will also realize that it may be necessary, for example, to remove particulate and/or cool the engine bleed air.

Figure 5:
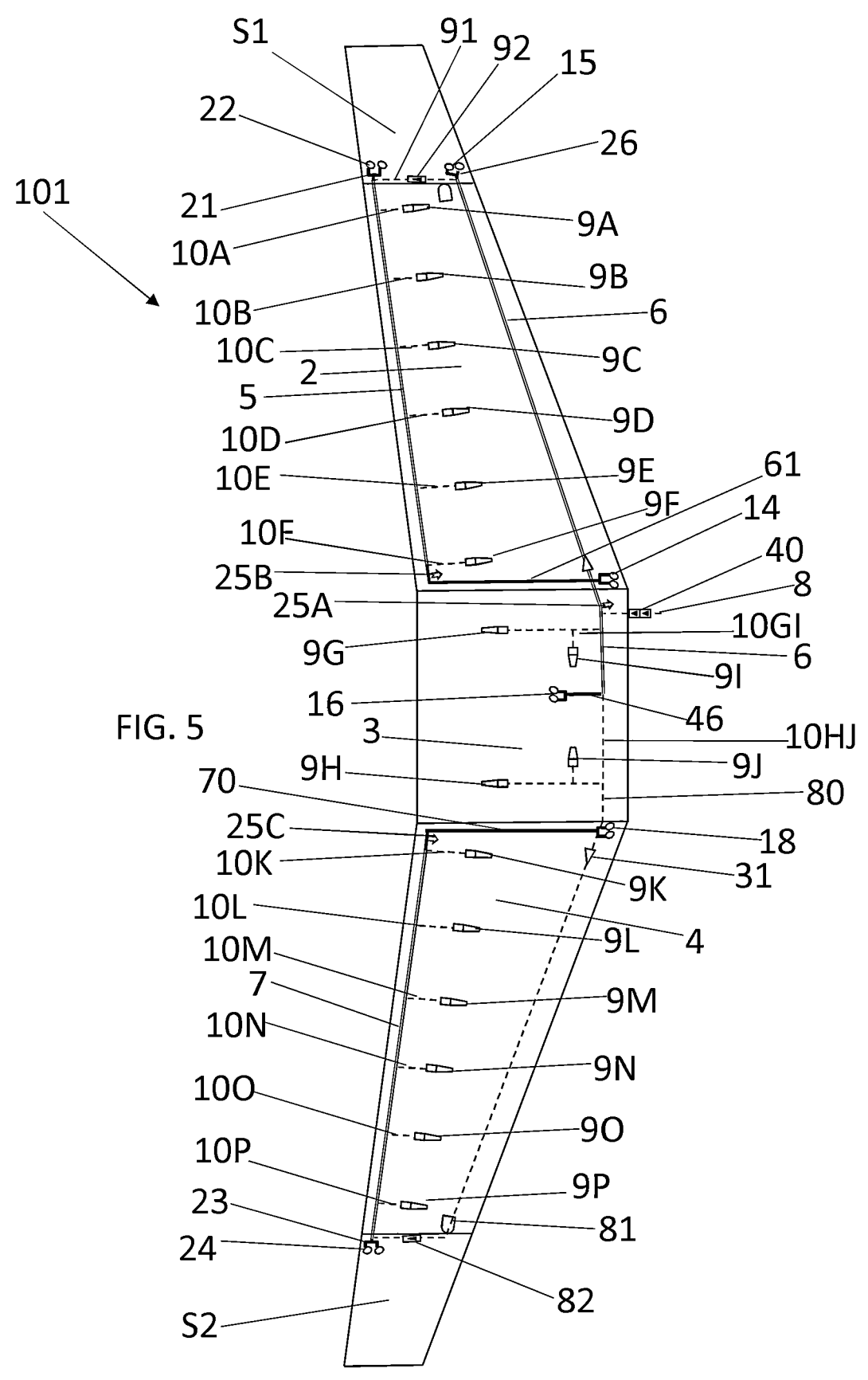
FIG. 5 shows a schematic plan view of an example of an aircraft fuel tank venting and inerting arrangement according to another embodiment of the invention.

An example of another embodiment of a fuel tank inerting and venting arrangement in accordance with the present invention will now be described with reference to FIG. 5.

Inerting fluid (typically in the form of nitrogen-enriched air) is received into a receiving conduit 8, which is partially located in center tank 3. Receiving conduit 8 carries only inerting fluid and does not carry venting fluid. Receiving conduit 8 is provided with dual flapper check valve 40 to inhibit backflow of fluid. Receiving conduit 8 is in fluid communication with common fluid flow conduit 6, delivering inerting fluid into the outer, inerting region 103 of common fluid flow conduit 6. Common fluid flow conduit 6 is located within, and extends laterally across, center tank 3. Inerting fluid is delivered to center tank 3 from common fluid flow conduit 6 via nozzles 9G, 9H, 91, 9J.

Inerting fluid is also delivered via the outer, inerting region 103 of common fluid flow conduit 6 outwards, to inerting conduit 91 located in or close to surge tank S1. Inerting fluid passes through a non-return valve 92, and into the outer, inerting 103 region of common fluid flow conduit 7, from where inerting fluid is delivered into fuel tank 2 via spurs 10A-F and nozzles 9A-F. Non-return valve 92 inhibits backflow of fluid, such as fuel, that may enter the inerting system.

Figure 7:
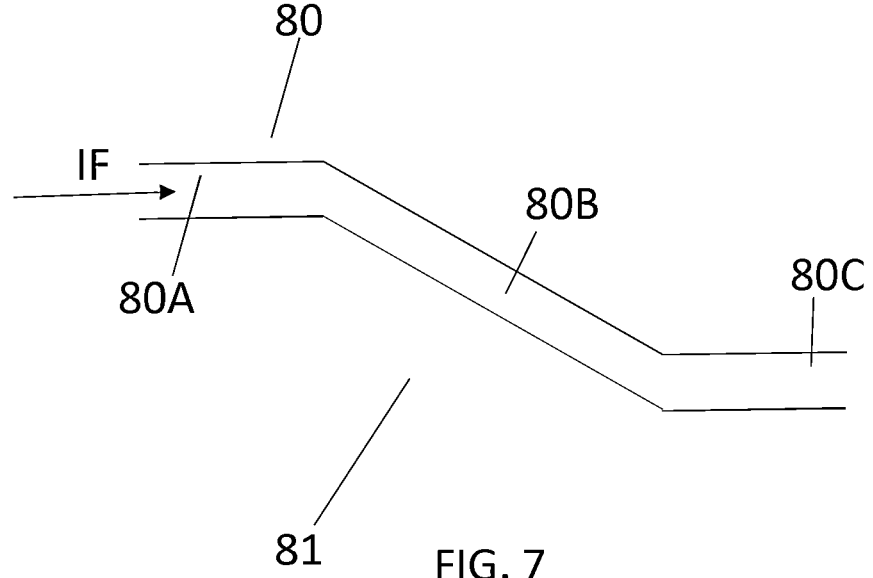
FIG. 7 shows a schematic representation of a weir for use in an aircraft fuel tank venting and inerting arrangement in accordance with the present invention.

Inerting of the starboard wing 4 will now be described by way of example only with reference to FIG. 5. Inerting fluid is delivered via the outer, inerting region 103 of common fluid flow conduit 6 to inerting conduit 80 via inerting line 10HJ. Inerting fluid passes through restrictor 31, which helps determine the mass flow of inerting fluid. Inerting conduit 80 is provided with a weir 81 that helps inhibit passage of liquid upstream i.e. towards restrictor 31. Referring to FIG. 7, weir 81 is formed in inerting conduit 80 by providing a dipping portion 80B of inerting conduit 80 between adjacent conduit portions 80A, C. This dipping portion 80B provides a barrier to inhibit passage of liquid upstream from portion 80C to portion 80A. Inerting conduit 80 is also provided with a non-return valve 82 for inhibiting backflow of fluid. Inerting conduit 80 is in fluid communication with the outer, inerting region 103 of common fluid flow conduit 7. Fluid is delivered from this region 103 of common fluid flow conduit 7 to fuel tank 4 via spurs 10K-P and nozzles 9K-P.

Common fluid flow conduits 5, 7 are located within the respective fuel tank 2, 4. Each common fluid flow conduit 5, 7 is located in a rearwards position, proximate the rear of the respective fuel tank 2, 4, and extends from an inboard position to an outboard position. "Rear" is determined in relation to the expected, normal direction of forwards flight of an aircraft comprising the arrangement 1. Furthermore, each of the common fluid flow conduits 5, 7 is located in an elevated position, proximate the top of the respective fuel tank 2, 4. This facilitates the delivery of inerting fluid to the space above the fuel in a fuel tank. "Elevated" is determined in relation to the normal, upright orientation of the aircraft. Common fluid flow conduit 6 extends from center tank 3 outwards across the front of port tank 2.

Once again, center tank 3 is provided with fuel drain valve 25A, starboard wing tank 4 is provided with fuel drain valve 25C and port wing tank 2 is provided with fuel drain valve 25B. Those fuel drain valves are located towards the low point of the respective pipe or conduit. They allow fuel in the venting pipework to enter the fuel tank. Fuel drain valve 25B is in fluid communication with connection conduit 61. Fuel drain valve 25C is in fluid communication with connection conduit 70. Fuel drain valve 25A is in fluid communication with an inner portion 102 of common fluid flow conduit 6.

The venting fluid flow paths for the three fuel tanks 2, 3, 4 will now be described with reference to FIGS. 5. Inner, venting region 102 of common fluid flow conduit 5 is in fluid communication with venting outlet 22 (in the form of a bifurcated bellmouth arrangement) via termination portion 21. Venting outlet 22 is in fluid communication with a surge tank S1, which is provided with a vent (not shown) that maintains the surge tank S1 at ambient pressure. Venting outlet 22 permits fluid communication between the ambient atmosphere and port wing tank 2. Termination portion 21 only carries venting fluid, and does not carry inerting fluid. Inner, venting region 102 of common fluid flow conduit 5 is also in fluid communication with vent 14 via connection conduit 61. Connection conduit 61 is configured to carry only venting fluid, not inerting fluid. Vent 14 is provided in fuel tank 2 and permits fluid communication between the fuel tank 2 and the ambient atmosphere via connection conduit 61, inner portion 102 of common fluid flow conduit 5, terminating portion 21 and venting outlet 22.

Inner, venting region 102 of common fluid flow conduit 7 is in fluid communication with venting outlet 24 (in the form of a bifurcated bellmouth arrangement) via termination portion 23. Venting outlet 24 is in fluid communication with a surge tank S2, which is provided with a vent (not shown) that maintains the surge tank S2 at ambient pressure. Venting outlet 24 permits fluid communication between the ambient atmosphere and starboard wing tank 4. Termination portion 23 only carries venting fluid, and does not carry inerting fluid. Inner, venting region 102 of common fluid flow conduit 7 is also in fluid communication with vent 18 via connection conduit 70. Connection conduit 70 is configured to carry only venting fluid, not inerting fluid. Vent 18 is provided in fuel tank 4 and permits fluid communication between the fuel tank 4 and the ambient atmosphere via connection conduit 70, inner portion 102 of common fluid flow conduit 7, terminating portion 23 and venting outlet 24.

The venting fluid flow path 54 for center tank 3 will now be described. Venting outlet 15 is in fluid communication with surge tank S1 and with termination conduit 26, which is configured to carry venting fluid only. Termination conduit 13 is in fluid communication with the inner or center portion 102 of common fluid flow conduit 6, which, in turn, is in fluid communication with venting conduit 46, which is in fluid communication with vent 16, which vent 16 is located in an upper portion of fuel tank 3. This arrangement facilitates maintaining fuel tank 3 at ambient pressure.

Figure 6:
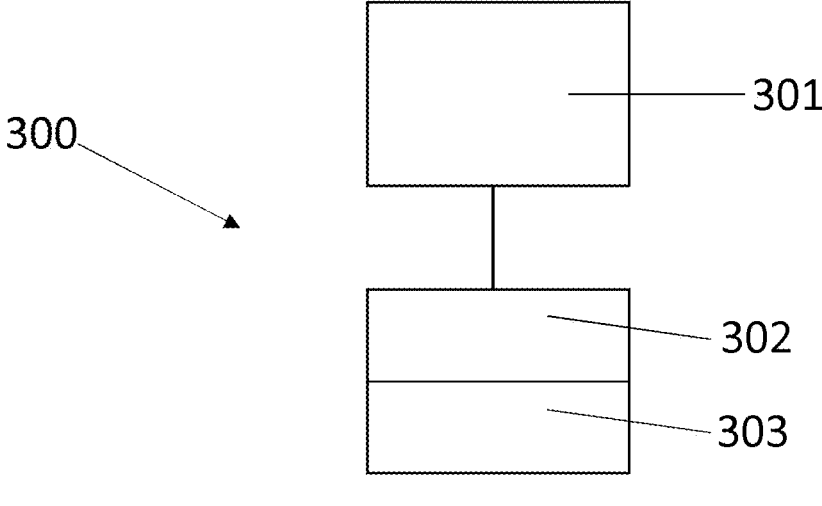
FIG. 6 shows a schematic representation of an example of a method of inerting and venting an aircraft fuel tank in accordance with another embodiment of the invention.

An example of an embodiment of a method in accordance with the present invention will now be described with reference to FIG. 6. The method is denoted generally by reference numeral 300. The method 300 comprises determining 301 whether it is desirable to inert one or more of the fuel tanks 2, 3, 4. Determining 301 may comprise determining a phase of flight of the aircraft. For example, it may be desirable to inert one or more of the fuel tanks 2, 3, 4 when the aircraft is ascending or descending. If it is deemed desirable to inert one or more of the fuel tanks 2, 3, 4, then the method 300 may comprise passing 302 inerting fluid to one or more of the aircraft fuel tanks 2, 3, 4 through a fluid flow conduit 5, 6, 7 while permitting 303 passage of venting fluid to and from one or more of the fuel tanks 2, 3, 4 through the same fluid flow conduit 5, 6, 7.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe an aircraft fuel tank venting and inerting arrangement comprising three fuel tanks; a center tank and two wing tanks. Those skilled in the art will realize that other fuel tank configurations are possible. For example, the aircraft fuel tank venting and inerting arrangement may comprise two tanks in each wing, with an inner and an outer tank.

The examples above describe an aircraft fuel tank venting and inerting arrangement used in conjunction with dihedral wings. Those skilled in the art will realize that the aircraft fuel tank venting and inerting arrangement of the present invention may be used with an anhedral wing. In that case, the location of the various venting and inerting conduits may be changed to suit the different orientation of the wing.

The examples above describe the use of nitrogen-enriched air as an inerting fluid. Those skilled in the art will realize that other inerting fluids may be used, such as noble gases.

The examples above describe an aircraft fuel tank venting and inerting arrangement used in conjunction with a twin-engine, narrow-bodied aircraft. Those skilled in the art will realize that the aircraft fuel tank venting and inerting arrangement of the present invention may be used with other aircraft, such as four-engine aircraft and wide-bodied aircraft.

The examples above describe an aircraft fuel tank venting and inerting arrangement with a particular configuration of venting outlets and inerting inlets. Those skilled in the art will realize that other configurations may be used.

The examples above disclose a particular configuration of the common fluid flow conduit, with an inner, venting region disposed concentrically within an outer, inerting region. Those skilled in the art will realize that other configurations are possible. For example, there need not be one of the regions disposed within the other of the regions. For example, the venting and inerting regions may be side-by-side, as opposed to being one within another. Furthermore, the common fluid flow conduit need not be circular in cross-section; other shapes may be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuel tank venting and inerting arrangement, comprising:
a fuel tank;
a venting fluid flow path between the fuel tank and a venting outlet;
an inerting fluid flow path for delivering inerting fluid to the fuel tank;
at least part of the venting fluid flow path being provided by a fluid flow conduit; and
at least part of the inerting fluid flow path being provided by the fluid flow conduit configured such that the inerting fluid may flow in the inerting flow path independently from and at the same time as flow of venting fluid flow in the venting flow path.

2. The arrangement according to claim 1 further comprising:
at least one conduit configured to carry inerting fluid only and at least one conduit configured to carry venting fluid only.

3. The arrangement according to claim 1, wherein the fluid flow conduit comprises a first venting region for a passage therethrough of venting fluid and a second inerting region for a passage therethrough of inerting fluid.

4. The arrangement according to claim 3, wherein each of the first venting region and the second inerting region extend between a first position along the fluid flow conduit and a second position along the fluid flow conduit.

5. The arrangement according to claim 3, wherein one of the first venting region and the second inerting region is located within a space defined by the other of the first venting region and the second inerting region.

6. The arrangement according to claim 3, wherein the first venting region is located within the second inerting region.

7. The arrangement according to claim 3, wherein the first venting region and the second inerting region are isolated from one another so that inerting fluid in the second inerting region is prohibited from entering the first venting region and venting fluid in the first venting region is prohibited from entering the second inerting region.

8. The arrangement according to claim 3, wherein the first venting region and the second inerting region are separated by a fluid-impermeable wall.

9. The arrangement according to claim 1, wherein at least part of the fluid flow conduit is located in a fuel tank.

10. The arrangement according to claim 9, wherein at least one portion of a fluid flow conduit providing at least a portion of an inerting fluid flow path and at least a portion of a venting fluid flow path is located in a starboard wing tank,
wherein at least a portion of a fluid flow conduit providing at least a portion of an inerting fluid flow path and at least a portion of a venting fluid flow path is located in a port wing tank, and
wherein at least a portion of a fluid flow conduit providing at least a portion of an inerting fluid flow path and at least a portion of a venting fluid flow path is located in a center tank.

11. The arrangement according to claim 1, further comprising:
a receiving portion of the inerting fluid flow path, the receiving portion being provided by a conduit that is configured to carry inerting fluid, but not venting fluid.

12. The arrangement according to claim 11, further comprising:
one or more inlets for introducing inerting fluid into one or more fuel tanks, and one or more spurs providing fluid communication to a respective inlet for introducing inerting fluid into one or more fuel tanks, and not venting fluid.

13. The arrangement according to claim 12, wherein at least one spur is configured to carry only inerting fluid, and not venting fluid.

14. An aircraft comprising:
an aircraft fuel tank venting and inerting arrangement in accordance with claim 1;
and one or more engines,
the aircraft fuel tank venting and inerting arrangement being configured to receive air from at least one engine.

15. A fluid flow conduit configured for use with the aircraft fuel tank venting and inerting arrangement of claim 1.

16. A method of venting and inerting an aircraft fuel tank, the method comprising:
passing inerting fluid to an aircraft fuel tank through a fluid flow conduit while permitting passage of venting fluid to and from the aircraft fuel tank through the same fluid flow conduit; and,
passing inerting fluid through an inerting region of the fluid flow conduit from a first position along the fluid flow conduit to a second position along the fluid flow conduit, while permitting passage of venting fluid through a venting region of the fluid flow conduit between said first position along the fluid flow conduit and said second position along the fluid flow conduit.

17. The method according to claim 16, further comprising:
passing the inerting fluid through an outer region of the fluid flow conduit and permitting passage of the venting fluid through an inner region of the fluid flow conduit.

18. An aircraft fuel tank venting and inerting arrangement, comprising:
a fuel tank;
a venting fluid flow path between the fuel tank and a venting outlet;
an inerting fluid flow path for delivering inerting fluid to the fuel tank;
at least part of the venting fluid flow path being provided by a fluid flow conduit; and
at least part of the inerting fluid flow path being provided by the fluid flow conduit,

wherein the fluid flow conduit comprises a first venting region for a passage therethrough of venting fluid and a second inerting region for a passage therethrough of inerting fluid, and, wherein the first venting region and the second inerting region are isolated from one another so that inerting fluid in the second inerting region is prohibited from entering the first venting region and venting fluid in the first venting region is prohibited from entering the second inerting region.

* * * * *